United States Patent [19]

Fourrey

[11] 4,045,043
[45] Aug. 30, 1977

[54] TRANSPORT AND DISPLAY TROLLEYS

[75] Inventor: François Fourrey, Montbeliard, France

[73] Assignee: Cycles-Peugeot, Beaulieu-Valentigney, France

[21] Appl. No.: 708,250

[22] Filed: July 23, 1976

[30] Foreign Application Priority Data

July 24, 1975 France .................................. 75.23136

[51] Int. Cl.² ............................................... B62B 3/00
[52] U.S. Cl. ..................................... 280/79.3; 108/111; 312/258
[58] Field of Search ........................ 280/79.3, 639, 651; 312/258, 262; 211/134, 150; 108/111, 27

[56] References Cited

U.S. PATENT DOCUMENTS 3,981,510  9/1976  Gustaffsson ..................... 280/79.3 X

FOREIGN PATENT DOCUMENTS 1,571,488  6/1969  France ................................. 280/79.3
76,243     5/1954  Netherlands ........................ 312/258
1,231,841  5/1971  United Kingdom ................. 280/79.2

Primary Examiner—Joseph F. Peters, Jr.
Assistant Examiner—Michael J. Forman
Attorney, Agent, or Firm—Sughrue, Rothwell, Mion, Zinn and Macpeak

[57] ABSTRACT

The trolley has a lower platform which is provided with rollers and carries two fixed lateral grills and a movable grill between the fixed grills. At least one horizontal shelf is pivotably mounted on a first of the fixed grills and is pivotable between a withdrawn position against the first fixed grill and a horizontal position in which the shelf bears against a rod of the second fixed grill. A gate mounted on one of the fixed grills to be movable inwardly of the space defined by the three grills from a closed position to an open position prevents the shelf from being pivoted to its withdrawn position so long as the gate is in its closed position. A fixed gate is disposed above the lower platform. The distance between the gates and the shelf immediately above them is less than the height of the objects to be transported by the trolley.

11 Claims, 3 Drawing Figures

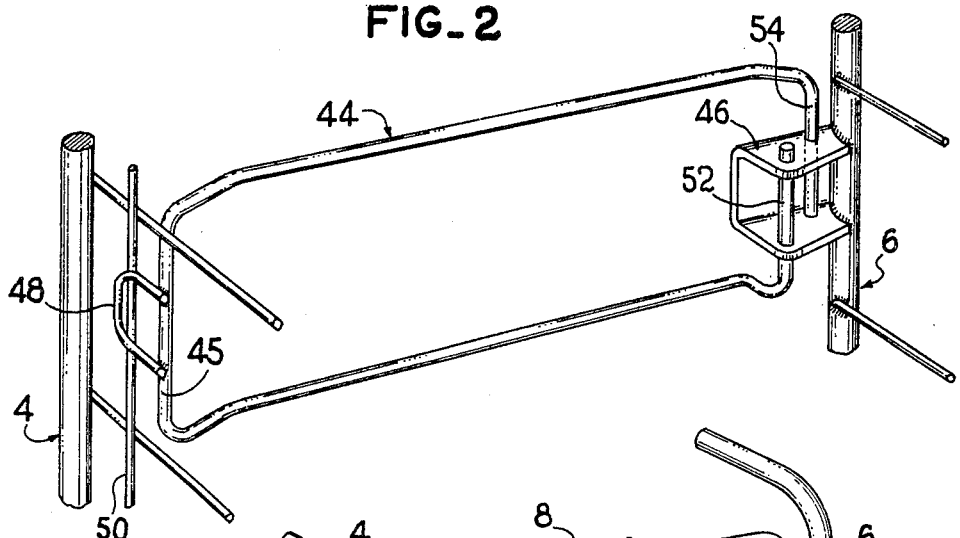
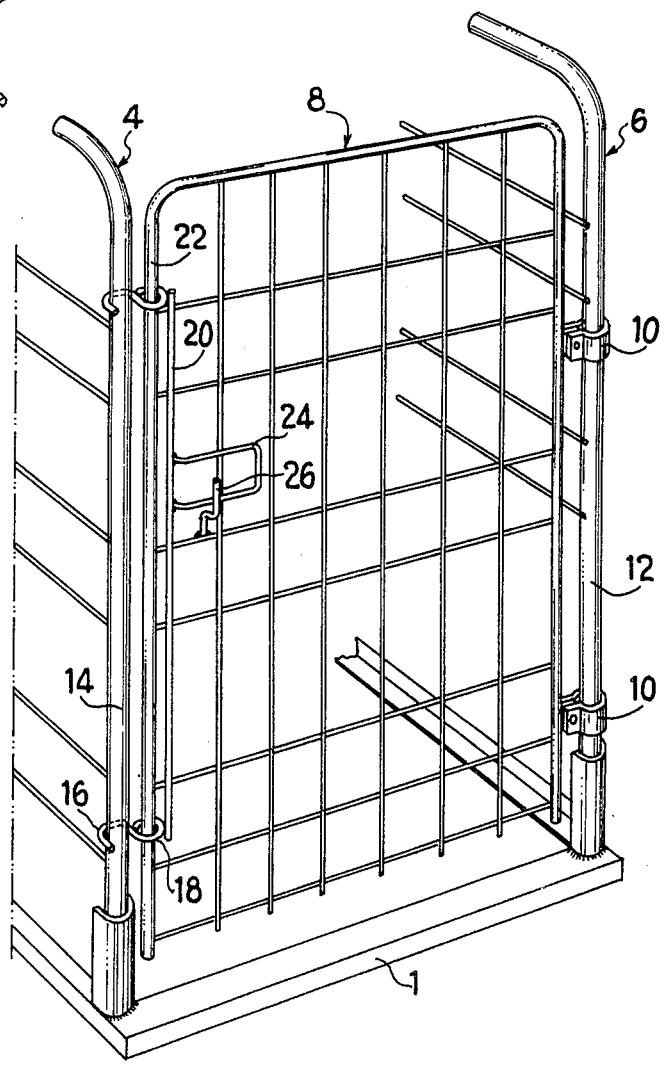

TRANSPORT AND DISPLAY TROLLEYS

The transport of bottles, containers and various objects between the manufacturing or filling stations, storage warehouses and vending stores or other places of use, at the present time require a large number of handling operations which of course require labour and are time-consuming.

In order to facilitate these handling operations there are often employed, at the present time, handling trolleys or trucks comprising a lower platform mounted on rollers and provided with vertical lateral walls which support plates or shelves. These trolleys are practical for shifting merchandize or goods from one point to another, but do not avoid the handling operations therebetween and the different display, storage or other stations.

An object of the present invention is to reduce considerably these handling operations by providing a trolley which can be employed both for the transport and the display and which can be loaded and unloaded either by quantities or by units in a well-determined order so that it easily adapts itself to a manufacturing, filling, treating, selling or other line and that in practice the goods are placed thereon once and for all and have no longer to be handled.

According to the invention, there is provided a transport and display trolley comprising a lower platform provided with rollers and carrying fixed lateral grills and a movable grill, wherein there are also provided at least one foldable shelf pivoted to one of the fixed lateral grills and foldable between a position folded against said one grill and a horizontal position parallel to the platform in which it bears against a rod of the opposite grill; an inwardly opening gate which interconnects the two fixed grills above each foldable shelf and is slightly set back from the outer edge of said shelf so that it precludes the folding and unloading of said shelf so long as it is closed; and a fixed gate fixed above the lower platform, the distance between each gate and the shelf immediately therabove being less than that of the objects to be transported.

This trolley can be easily filled through its rear face after shifting the movable grill, it being possible to load all the shelves by an automatic machine for example. On the other hand, on the other face the shelves are accessible only in succession in the downward direction, which necessitates taking the objects one by one in a well-determined order and always ensures a correct display.

This trolley may also be employed the opposite way round, that is to say, filled through the face carrying the gates from the lower shelf and unloaded in one operation after opening the movable grills. The folding of the shelves is simple and the folded shelf can be held stationary so as to avoid hindering the taking hold of and the displacement of the objects.

The following description of an embodiment, given solely by way of example and shown in the accompanying drawings will bring out the advantages and features of the invention.

In the drawings:

FIG. 2 is a detail view of an openable gate of the trolley shown in FIG. 1, and

FIG. 3 is a rear elevational view of the trolley showing the closing of the movable grill.

Figure 1:
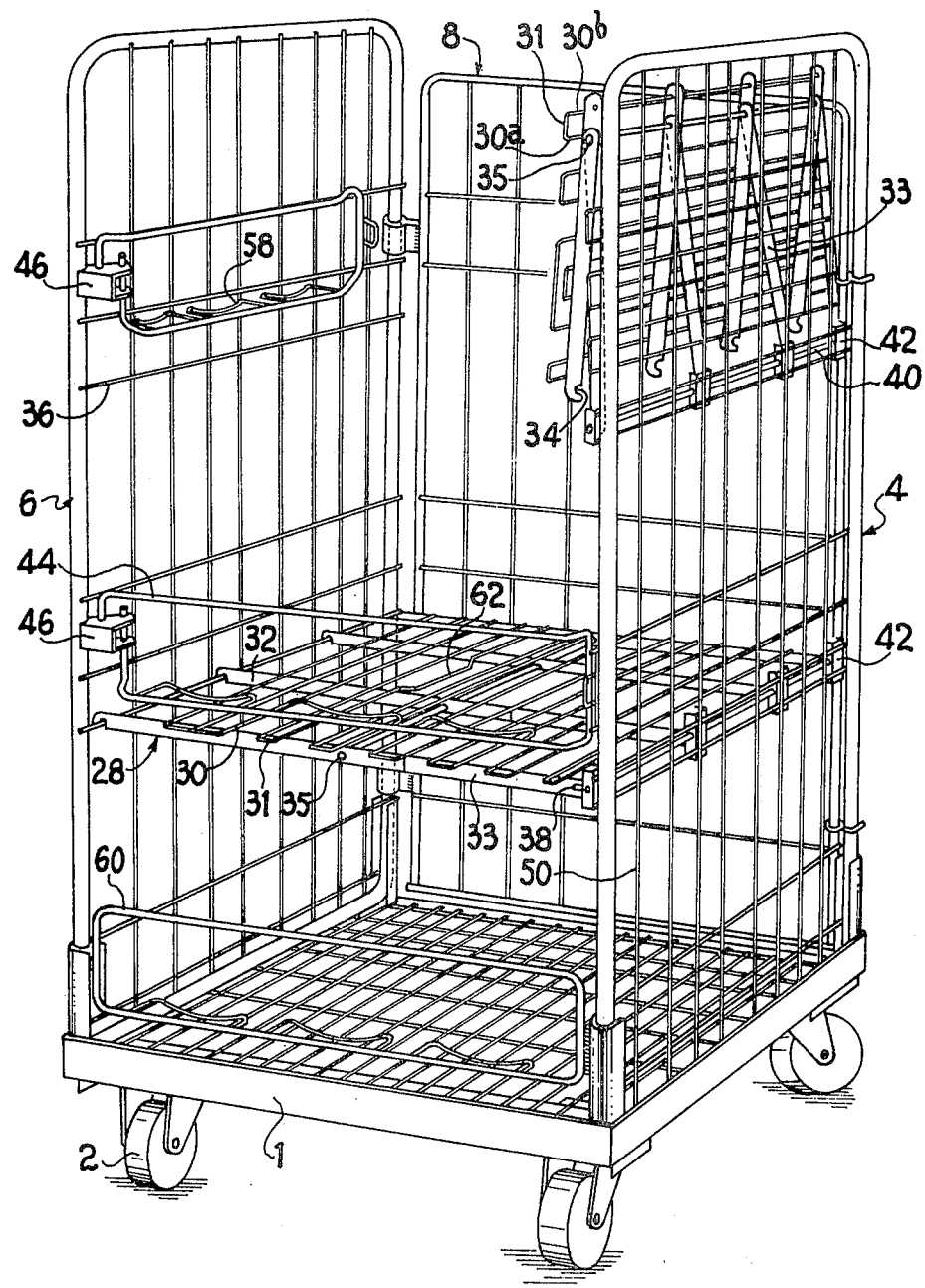
FIG. 1 is a perspective view of a trolley according to the invention.

The trolley comprises a lower platform 1 (FIG. 1) mounted on rollers 2 and supporting on two opposite sides fixed grills 4, 6 between which a movable grill 8 is mounted. This grill may be pivotable or completely removable. In the embodiment according to the invention, it is mounted by annular rings 10 on one of the uprights 12 of the grill 6 and it is maintained on the opposite upright 14 of the grill 4 by two hooks 16 (FIG. 3) each of which is integral with a ring 18. The two rings 18 are fixed on a vertical rod 20 and are freely slidable and rotatable around the upright 22 of the grill 8 which is adjacent to the upright of the grill 4. The rod 20 is moreover integral with a handle 24 formed by a wire bent into the shape of a U and welded to the rod 20 which cooperates with a vertical hook 26 and slides between this hook and the grill 8.

The door is thus opened simply by raising the handle 24 out of the hook 26 and pivoting the handle and rod 20 about the upright 22 so as to move the hooks 16 away from the upright 14 and thus release the grill 8. The grill 8 is closed by pivoting the hooks 16 in the opposite direction and lowering the handle 24 into the hook 26.

Shelves or trays 28 are mounted between the vertical grills 6 and 4, namely two shelves in the illustrated embodiment which are constituted by grills forming two half-shelves pivoted together. Each of these half-shelves has a number of rods 30 parallel to the grills 4 and 6 supported by bars 32 and 33 parallel to the grill 8. The rods 30 are preferably interconnected in pairs at 31 at the end thereof opposed to the movable grill 8 and extend beyond the transverse bar 32, 33 the most remote from this grill.

The transverse bars 32 of one of the half-shelves are provided in the lower part thereof with a notch which forms at the end thereof a hook 34 capable of fitting over one of the horizontal rods 36 of the grill 6. The transverse bars 33 of the second half-shelf are provided with an elongated aperture 38 through which there extends a rod 40 which is parallel to the rod 36 and fixed to the grill 4 in the same horizontal plane as this rod 36. The rod 40 is supported by flanges of vertical U-section slideways 42 which act as lateral abutments for the bars 33 when the shelf is folded in the position shown in the upper part of the trolley in FIG. 1. At the end of the bars 33 opposed to the aperture 38 the bars 33 are pivotably mounted on a pivot rod 35 which constitutes the articulation axis of the two half-shelves and extends through the bars 32 at a certain distance from the end thereof. Thereafter, the bars 32 extend beyond the rod 35 along the bars 33 and the end rods 30$^a$, 30$^b$ of the left shelf in FIG. 1 bear, in the horizontal position of the shelf, both on the transverse bars 32 and on the bars 33, there being no rod connecting the latter at this point. The U-shaped loop portion 31 which interconnects the bars 30$^a$ and 30$^b$ thus forms an abutment which limits the relative displacement of the two half-shelves.

Thus these two half-shelves can be folded against each other from their horizontal position when the rod 30$^a$ and 30$^b$ are shifted upwardly, but cannot in any way be folded in the other direction. Moreover, as the apertures 38 have an elongated shape, the bars 33, as soon as they reach the vertical position, move slightly downwardly while being guided by the slideways 42 and are locked between the slideways and the rod. The two half-shelves are then blocked in the position in which they are folded against the grill 4 which they can leave only if the bars 33 are again raised.

When the foldable shelf 28 is in a horizontal position the trolley is closed, on the side thereof opposed to the grill 8, by a gate 44 which is pivoted to the grill 6 by an elastically yieldable system 46 which biases it automatically either to its closing position parallel to the grill 8 or to a fully open position in which it bears against the grill 6. A gate 44 is disposed above each of the foldable shelves 28 at a slight distance thereabove but set back inwardly of the trolley with respect to the loop portions 31 and each of these gates is provided with an abutment 48 (FIG. 2) which is substantially perpendicular to its general plane and fits on one of the vertical rods 50 of the grill 4 and ensures the closure. In this position, it is clear that the shelf 28 can be neither raised nor folded, since the rods 30$^b$ and the bar 32 immediately abut the gate.

Preferably, the gate is apertured in such manner as to allow a push-member or the like to be passed therethrough so as to push the containers, or other objects disposed on the shelf outwardly of the trolley after the grill 8 has been opened.

In the illustrated embodiment, each gate is formed by a rod or like filiform substantially rectangular structure which is bent in the vicinity of its two small sides as shown in FIG. 2. One of these small sides 45 carries the abutment 48 which preferably itself formed by a bent wire or rod, whereas the opposed small side is formed by two parallel pins 52, 54 which are spaced apart and pivotably mounted in the member 46 integral with the grill 6. The pins 52 and 54 are in a vertical plane which makes an acute angle with the plane of the grill 6 and with the plane of the open side of the trolley. The frame 44 is slightly warped and the pivoting of its two large sides are eccentric relative to each other. The gate has a relatively stable position in the vicinity of the plane through the pins 52, 54, but tends to automatically swing to either side of this plane to a position against the grill 6 or to a position parallel to the grill 8. It holds itself in the holding position but tends to assume a fully open position as soon as it is pivoted through a given angle (FIG. 1). Each of the gates 44 is preferably provided with means 58 constituting abutments for blocking the containers or other objects placed on the shelf, for example during transport.

The lower platform 1 is also closed by a gate constituted by a rectangular frame 60, but this gate is fixed and constantly maintained between the two grills 4 and 6. The height of each gate, whether it is openable or fixed, is so chosen as to practically preclude the passage of the containers, or other objects to be transported, therebetween and the shelf immediately above. Thus each shelf can only be unloaded when the upper shelf is folded back. The trolley must therefore be necessarily unloaded from the upper part thereof of loaded from the lower part thereof when the objects or containers must be displaced one by one.

Such a trolley is particularly adapted for the transport and display of bottles or containers which are subsequently returned against payment of a sum of money. In this case, the trolley can be placed directly in the filling or bottling line. The full bottles are introduced after opening the grill 8, by layers each of which corresponds to a whole shelf. The three shelves of the trolley shown in FIG. 1 are thus filled in succession and then the grill 8 is closed again. The abutments 58 ensure the blocking of the bottles and the gate is locked by the mere presence of these bottles—which permits a transport without risk. The trolley is brought to the vending point and used for display. The bottles are visible and easy to distinguish through and above the gate. However, only the bottles placed on the upper shelf are accessible.

When this shelf is partly empty, the gate is partly opened merely by pushing thereon inwardly of the trolley, so as to, for example, facilitate the withdrawal of the bottles near to the rear grill 8 and continues to open on its own as unloading proceeds. As soon as the gate is fully open and the shelf is empty, the latter folded back by merely shifting one of the rods 30, for example by means of a handle 62 formed by a central curve of one of the rods. This handle is simply raised to withdraw the hooks 34 of the rod 36 then to fold the bars 32 toward the bars 33 and bring the latter to a vertical position, which blocks the apertures 38 in the slideways 42. The bottles of the shelf immediately below are then accessible. No false movement is to be feared since the shelves can not be folded back so long as the gate 44 is not fully open and this gate can only open completely if the shelf is unloaded.

The trollay can be reloaded at any time without being displaced by opening the rear grill 8. When completely empty, it can also be withdrawn or immediately re-utilized on the spot, for example for receiving the returned empty bottles. These containers or bottles are placed one by one first on the lower platform then on the upper shelves which are folded out as loading procceeds. The unloading is then carried out by layers after opening the grill 8 by means of a push-member or the like which passes through the corresponding gate.

Such a trolley permits the transport and the display of very varied objects whether they be intended for sale or utilization, in the course of manufacture or treatment. It indeed permits the loading and unloading by quan‡ities or by units and the transport between the different stations while ensuring a pleasing and practical display.

Having now described my invention what I claim as new and desire to secure by Letters Patent is:

1. A transport and display trolley comprising a lower platform, rollers mounted on the lower platform for shifting the trolley, two fixed grills and a movable grill, the three grills being vertically disposed and defining a space for receiving objects to be transported and being carried by the lower platform, at least one foldable shelf pivotably mounted on one of the fixed grills, the other fixed grill being opposed to said one fixed grill and having a transverse support means for said foldable shelf, said foldable shelf being pivotable between a folded back position in which it is folded against said one fixed grill and a horizontal position parallel to the platform, in which horizontal position said foldable shelf is supported on said support means; an openable gate movable from a closed position and an open position inwardly of said space defined by the grills and capable of interconnecting said two fixed grills in said closed position and disposed above said foldable shelf and slightly set back relative to an outer edge of said foldable shelf in said closed position whereby it precludes the pivoting of said foldable shelf to said folded back position and the unloading of said foldable shelf so long as the gate is in said closed position; and a fixed gate disposed above the lower platform connecting said two fixed grills together.

2. A trolley as claimed in claim 1, wherein said support means comprises a rod carried by said other fixed grill.

3. A trolley as claimed in claim 1, wherein an elastically yieldable system pivotably mounts the openable gate on one of the fixed grills, the elastically yieldable system being capable of permitting the displacement of the openable gate inwardly of said space between said closed position and said open position in which open position it is folded against the corresponding fixed grill.

4. A trolley as claimed in claim 1, wherein the fixed grills each have substantially horizontal support means and the foldable shelf comprises two half-shelves pivoted together and provided with abutments for limiting their relative pivoting, one of said half-shelves having notches for bearing against said substantially horizontal support means of one of the fixed grills and the other half-shelf having elongated apertures slidable on said substantially horizontal support means of the other fixed grill, vertical slideways carried by said other fixed grill being cooperative with said other half-shelf for guiding and holding the half-shelf in a folded back position against said other fixed grill.

5. A trolley as claimed in claim 4, wherein the half-shelves are formed by grills having bars which are parallel to the movable grill and rods which are fixed transversely on said bars and extend beyond the bars on the open side of the trolley opposed to the movable grill and form abutment means cooperating with said bars for stopping the movement of the half-shelves in said horizontal position.

6. A trolley as claimed in claim 1, wherein recessed in the gate is an aperture.

7. A trolley as claimed in claim 1, wherein each openable gate is formed by a substantially rectangular frame bent adjacent the ends of the frame, one of the small sides of the frame being defined by two parallel pivot pins spaced apart from each other and offset relative to the general plane of the rectangular frame, a fixed support integral with one of said fixed grills pivotally supporting said pivot pins which are contained in a plane making an acute angle with the corresponding fixed grill.

8. A trolley as claimed in claim 7, wherein the small side of the openable gate remote from said pins carries an abutment for fitting on a vertical rod of the adjacent fixed grill in the closed position of the openables gate.

9. A trolley as claimed in claim 1, wherein a lower side of both said openable and fixed gates supports abutments for blocking containers or objects placed on the respective platform or shelf.

10. A trolley as claimed in claim 1, wherein the movable grill is pivotally mounted on one of the fixed grills and carries means for releasably securing said movable grill in a closed position which are vertically and rotatably movable about a vertical axis on the movable grill and define at least one hook for engaging the adjacent fixed grill and a slidable bolt member for holding said hook stationary.

11. A trolley as claimed in claim 1, wherein the distance between each of said openable and fixed gates and the shelf immediately above the respective gate is less than the height of the objects to be transported.

* * * * *